United States Patent [19]

Yamada et al.

[11] Patent Number: 5,562,825

[45] Date of Patent: Oct. 8, 1996

[54] FILTER ELEMENT HAVING A FLAT AND NON-FLAT CONFIGURATION

[75] Inventors: Katsuhisa Yamada, Okazaki; Yoshihiko Ohya, Takahama; Yoshihiro Taki; Takanari Takagaki, both of Nagoya; Yoshimitsu Yamaguchi, Chita-gun, all of Japan

[73] Assignee: Nippondenso Co., Ltd., Kariya, Japan

[21] Appl. No.: 241,590

[22] Filed: May 12, 1994

[30] Foreign Application Priority Data

May 21, 1993 [JP] Japan .................................. 5-142972

[51] Int. Cl.⁶ ............................................. B01D 63/14
[52] U.S. Cl. ........................ 210/321.74; 210/321.76; 210/321.85; 210/493.4; 55/498; 55/500; 55/520; 55/521
[58] Field of Search ................. 210/321.74, 321.76, 210/321.85, 493.4; 55/497, 498, 500, 520, 521

[56] References Cited

U.S. PATENT DOCUMENTS

| | | |
|---|---|---|
| 2,599,604 | 6/1952 | Bauer et al. . |
| 4,310,419 | 1/1982 | Nara et al. . |
| 4,652,286 | 3/1987 | Kusuda et al. . |
| 4,925,561 | 5/1990 | Ishii et al. ................... 55/521 |
| 5,002,666 | 3/1991 | Matsumoto et al. . |
| 5,049,326 | 9/1991 | Matsumoto et al. . |
| 5,435,870 | 7/1995 | Takagaki et al. ............ 156/189 |

FOREIGN PATENT DOCUMENTS

| | | |
|---|---|---|
| 87067 | 8/1983 | European Pat. Off. . |
| 556932 | 8/1993 | European Pat. Off. . |
| 7525781 | 8/1975 | Germany . |

Primary Examiner—W. L. Walker
Attorney, Agent, or Firm—Cushman, Darby & Cushman

[57] ABSTRACT

A filter element of the present invention provides low pressure loss, superior filter performance and bonding of filtering material, and compactness. An inlet path of a nearly semicircular configuration which is formed in the width direction of a filter element is open at its upper side and closed at its lower side. An outlet path is closed at its upper side and open at its lower side. Corrugated filtering material has continuous mountain portions and valley portions. The mountain portions have a large radius of curvature R1, and the valley portions have a small radius of curvature R2. The valley portions are bonded to a flat filtering material. The open surface area of the inlet path is larger than the closed surface area of the outlet path 16. Preferably, R1/R2 is set so as to be within the range of 1.5 to 3.0.

26 Claims, 7 Drawing Sheets

5,562,825

FILTER ELEMENT HAVING A FLAT AND NON-FLAT CONFIGURATION

BACKGROUND OF THE INVENTION

1. Field of the Invention

The present invention relates to a filter element utilized in an oil filter, air cleaner device, fuel filter, or the like.

2. Description of the Related Art

An automobile, for example, is equipped with a fuel filter which includes a filter element for the purpose of removing contaminants from fuel which is supplied to an engine.

As shown in FIG. 10, the filter element may uses flat filtering material 181 and corrugated filtering material 182. In fabricating this filter element, adhesive 2a is applied in narrow stripes along the longer direction (corrugating direction) to the corrugated filtering material 182 on the upper side (upstream or fuel inlet side) 71 and to the flat filtering material 181 on the lower side (downstream or fuel outlet side) 79, respectively. Following this, the flat filtering material 181 is overlaid with the corrugated filtering material 182, and these materials are then rolled into a spiral shape.

In the above-mentioned filter element, it is not necessary to align with care the flat filtering material 181 and the corrugated filtering material 182 when performing rolling. In addition, the corrugated filtering material 182 is in the configuration most easily formed when forming with a corrugated roller. Because of this, efficiency is good and productivity is good as well.

However, the ratio of the open area of the fuel inlet path 14 on the upper side 71 to the sealed area of the fuel outlet path 16 is 1:1, and the cross-sectional configuration of both is symmetrical. The inlet path 6 is desired to be large enough because the fuel 6 may include contaminants therein. However, because of the above configuration, the amount of fuel 6 entering into the inlet path 14 is restricted, and filter performance is inadequate.

The fuel filter of Japanese Patent Application Laid-open No. 126907/1990 (U.S. Pat. No. 5,002,666) has been proposed in this regard.

As shown in FIGS. 11 and 12, the above-mentioned fuel filter is provided midway in a fuel line 90, which supplies fuel 6. The fuel filter 9 comprises a filter case 91, a cover 92 installed atop the filter case 91, and a filter element 1 contained within the filter case 91.

Fuel 6 enters the fuel filter 9 via an inlet 920 formed in the center of the cover 92, is filtered by the filter element 1, and is supplied to the engine not illustrated via an outlet 930 formed in the center of the bottom of the filter case 91.

As shown in FIG. 13 further, the filter element 1 may be porous filter paper 10 which has been fabricated in a corrugated shape with alternate mountains and valleys and which is then rolled into a spiral shape to form a tubular configuration.

The corrugated filter paper 10 is bonded such that the respective valleys 131 and 151 and the respective mountains 139 and 159 of corrugated filtering materials 13 and 15 are facing each other. Alternating tubular inlet paths 14 and outlet paths 16 are formed between the mountains 139 and 159. As shown in FIG. 12, the lower side 79 of the inlet paths 14 is bonded with adhesive 2b.

In addition, as shown in FIG. 12 and FIGS. 14A and 14B, the upper side 71 of the outlet paths 16 is bonded with adhesive 2a.

The inlet paths 14 are open on the upper side 71 and closed on the lower side 79. Meanwhile, the outlet paths 16 which are adjacent to the inlet paths 14 are closed on the upper side 71, and the lower side 79 is open.

In this filter element 1, as shown in FIG. 12, fuel 6 flows into the inlet paths 14 from the upper side 71, and the fuel 6 passes through porous filter paper 10, passing from the inlet paths 14 to the outlet paths 16. At this time, contaminants mixed in with the fuel 6 are trapped on the filter paper 10 on the side of the inlet paths 14.

The above-mentioned fuel element 1 may also be utilized as any of various types of filters for air cleaners and the like in addition to use as a fuel filter for automobiles.

Next, in manufacturing the foregoing filter element, lengthy filtering material is first formed into a corrugated configuration to fabricate corrugated filtering materials 13 and 15, as shown in FIG. 13. Following this, adhesive 2a and 2b is applied in narrow stripes along the longer direction to the corrugated filtering material 13 on the upper side 71 and to the corrugated filtering material 15 on the lower side 79, respectively. Next, the corrugated filtering materials 13 and 15 are laid one atop the other such that the respective valleys 131 and 151 and mountains 139 and 159 of the corrugated filtering materials 13 and 15 face each other as shown in FIG. 14B, and filter paper 10 is obtained. Following this, the filter paper 10 is rolled along the direction of length into a spiral shape.

However, when rolling the foregoing roll filter paper 10, the adhesive 2a and 2b may protrude as shown in FIG. 14A, or the bonding of the adhesive may be imperfect. Because of this, the chance exists that the lower side 79 of the inlet paths 14 and the upper side 71 of the outlet paths 16 may not be perfectly closed.

In addition, when superposing the corrugated filtering material 13 and the corrugated filtering material 15, it is necessary to perform alignment with care so that the respective valleys 131 and 151 and the respective mountains 139 and 159 face each other, which poses problems in productivity for volume production.

In addition, if the tubes of the inlet paths 14 and outlet paths 16 are not bonded inter alia, an imperfect seal is obtained, and dust-filtration performance is diminished.

SUMMARY OF THE INVENTION

The present invention is to solve the problems set forth above, and has as an object to provide an improved filter element.

Another object of the present invention is to provide a filter element which has a large open surface area on an upper side of the fluid to be filtered, and which has a structure which may be manufactured with comparative ease.

Still another object of the present invention is to provide a filter element which has high resistance to pressure.

A further object of the present invention is to provide a filter element which curtails the amount of closing material on the upper side which closes the fluid passages at the position close to the upper side.

According to the improved structure of the present invention, a second filtering material of corrugated shape is provided between a first filtering material of flat shape and a third filtering material of flat shape such that the ridges of the mountain portions of the second material touch the first material and the ridges of the valley portions of the second material touch the third material. The areas between the ridges of the mountain portions and the ridges of the valley portions of this second material are formed as arc-shaped walls which are convexities that primarily face the first material. The area between the second material and the third material is taken to be the inlet side opening, and the opening surface area of the inlet side is made larger than the closed surface area of the closed material on the upper side.

It is preferable for the mountain portions to be made virtually semicircular with a radius of curvature R1, and it is preferable for the valley portions to be made with a radius of curvature R2 which is sufficiently smaller than the radius of curvature R1. It is further preferable for the ratio of the radius of curvature R1 and the radius of curvature R2 to be made not less than 1.5 and not more than 3.0

Additionally, the first material and the third material may share or is made of a common piece of material in which the flat material and corrugated material are rolled such that the flat material which touches the inner and outer peripheries of the corrugated material serves as the first material and the third material.

According to the present invention, manufacturing is simple because the filter element is structured with a flat material and a corrugated material, and along with this, because the open surface area of the inlet for the fluid to be filtered can be made large, the problems of the filter element of the prior art are solved because it is possible to simultaneously achieve simplification of manufacturing and a larger size of the open surface area of the inlet.

Further, because the areas between the ridges of the mountain portions and the ridges of the valley portions are structured as arc-shaped walls which are convexities that primarily face the first material or, more preferably, the two arc-shaped walls are made to be continuous and virtually semicircular, the present invention demonstrates superior pressure resistance with regard to the pressure of the fluid to be filtered acting from the inlet-side opening. Because of this, deformation of the second material due to progressive clogging of the second material can be suppressed, and stabilized superior filter performance can be maintained for long periods.

Moreover, because the areas between the ridges of the mountain portions and the ridges of the valley portions are structured as arc-shaped walls which are convexities that primarily face the first material, and the open surface area of the inlet side is made to be larger than the closed surface area of the closed material on the upper side, the closure material on the upper side can be curtailed.

DETAILED DESCRIPTION OF THE PREFERRED EMBODIMENTS

Hereinafter, embodiments of a filter element according to the present invention will be described with reference to the attached drawings.

Figure 1:
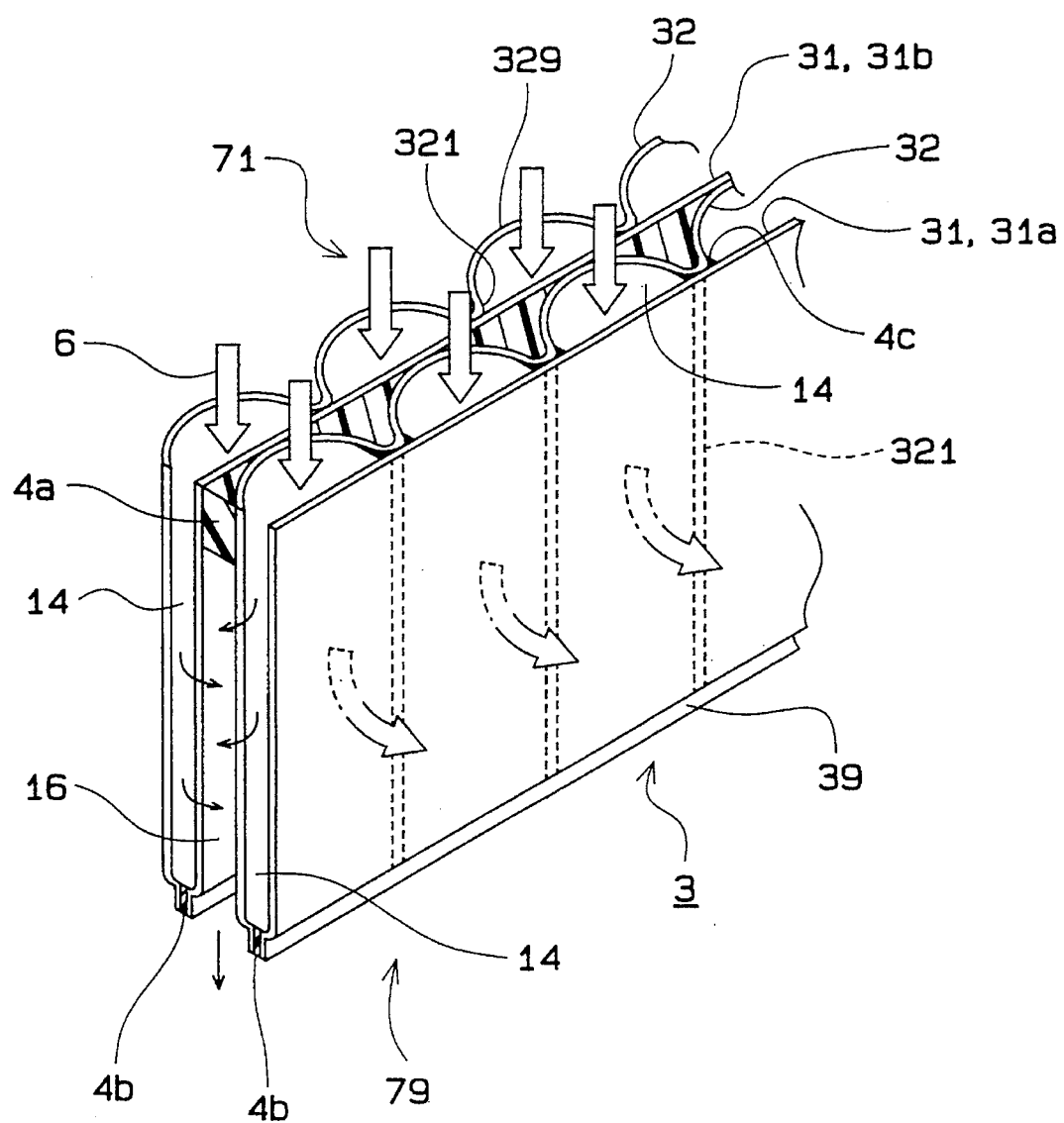
FIG. 1 is a perspective view of a filter element according to a first embodiment of the present invention.
Figure 12:
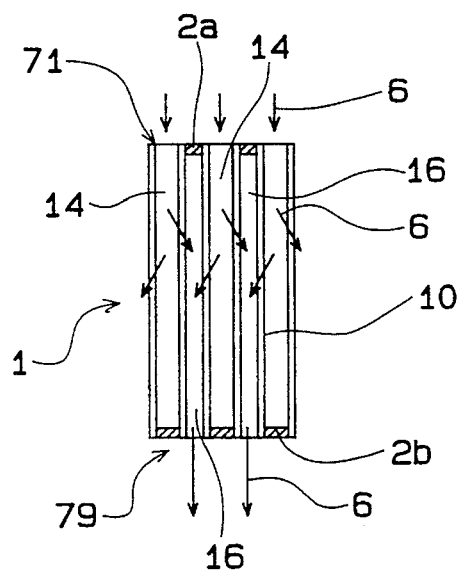
FIG. 12 is an explanatory view showing the operation of another filter element of the prior art.
Figure 13:
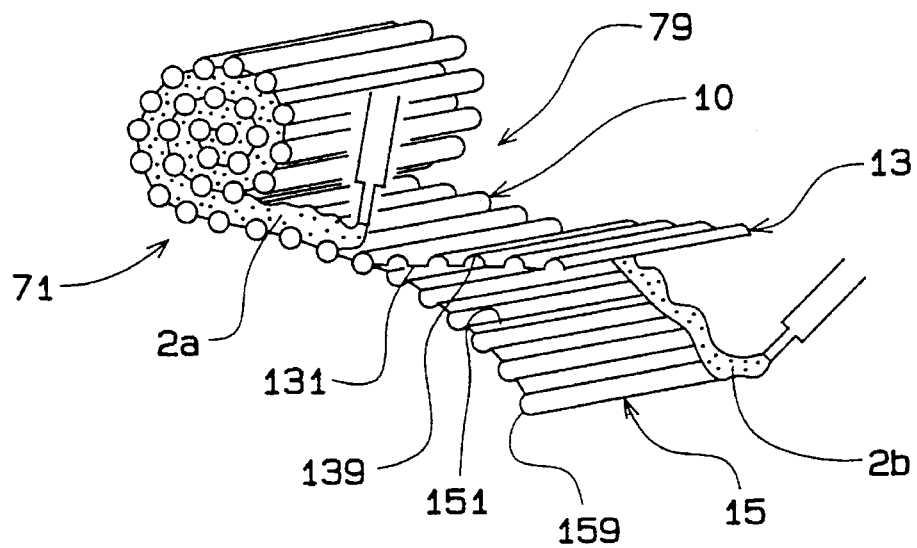
FIG. 13 is an explanatory view showing the method of manufacture of another filter element of the prior art.
Figure 14A:
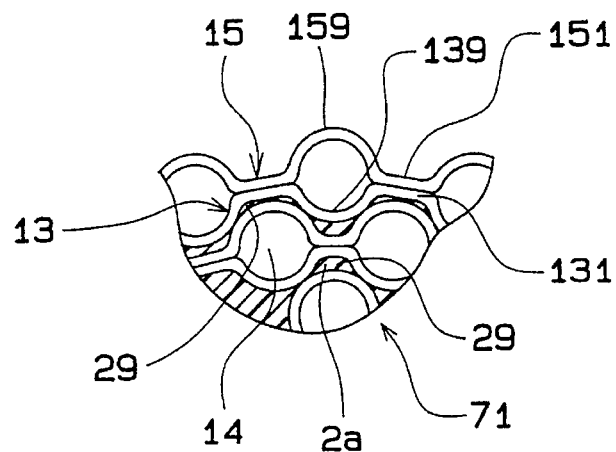
FIGS. 14A and 14B are explanatory views showing the problems of another filter element of the prior art.
Figure 14B:
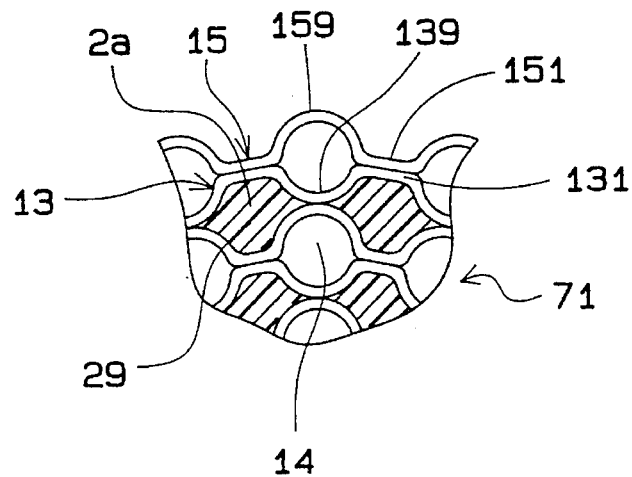

A filter element 3 for filtering fluid 6 according to a first embodiment, as shown in FIG. 1, is made of a lengthy flat filtering material 31 as a first filtering material 31b and a third filtering material 31a as well as a lengthy corrugated filtering material 32 as a second filtering material arranged one atop the other, with these rolled in their directions of length. The filter element 3 may be used in the well known manner, for instance, as shown in FIG. 12.

The filter element 3 has inlet paths 14 which are formed along its axial length and which have a cross-sectional shape of a substantially or nearly semicircular configuration, as well as outlet paths 16 which are formed side by side with the inlet paths 14 and extends axially.

Figure 4:
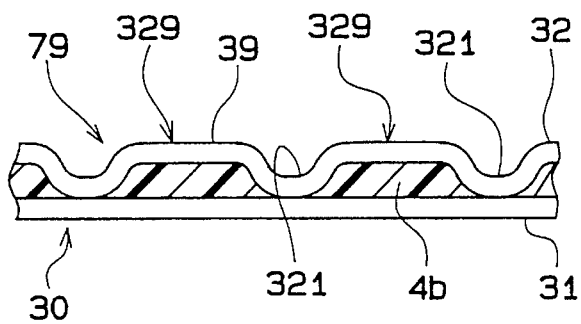
FIG. 4 is an explanatory view showing the state of crimped closure of the lower side in the inlet paths of the filter element of the first embodiment.

The inlet paths 14 are open on their upper side 71, and their lower side 79 is closed with adhesive 4b (best shown in FIG. 4).

The outlet paths 6, conversely, are closed with adhesive 4a on their upper side (best shown in FIG. 3), and they are open on their lower side.

The corrugated filtering material 32 has mountain portions 329 and valley portions 321 arranged in alternation.

The inlet paths 14 are formed between the mountain portions 329 and one end of the flat filtering material 31a positioned at the inner surface of the mountain portions 329 as the third material. Conversely, the outlet paths 16 are formed between the valley portions 321 and the other end of the flat filtering material 31b positioned at the outer surface of the valley portions 321 as the first or third filtering material.

The flat filtering material 31a and the ridges of the valley portions 321 of the corrugated filtering material 32 are bonded by means of adhesive 4c so that these are mutually independent and form the adjacent inlet paths 14 extending axially.

Figure 2:
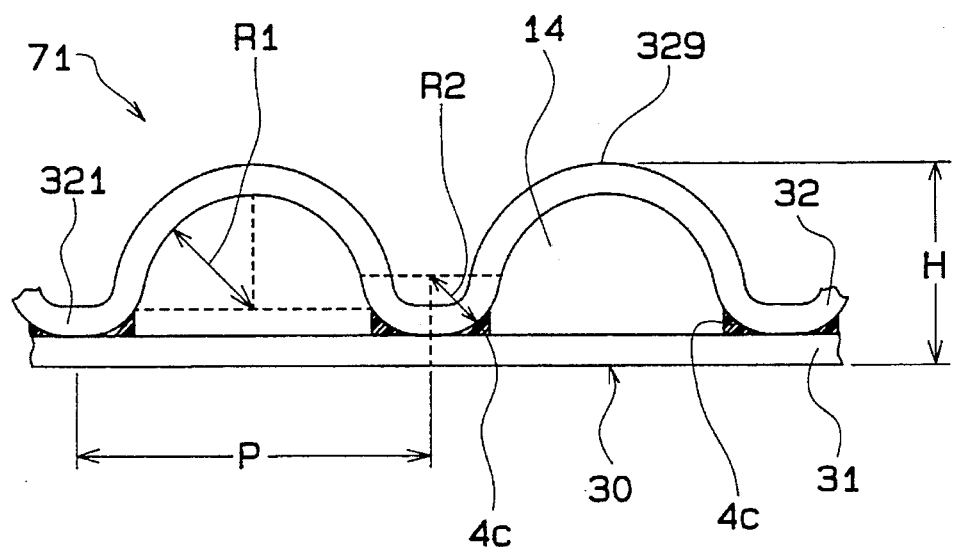
FIG. 2 is an explanatory view showing the configuration and dimensions of a corrugated filtering material of the first embodiment.
Figure 3:
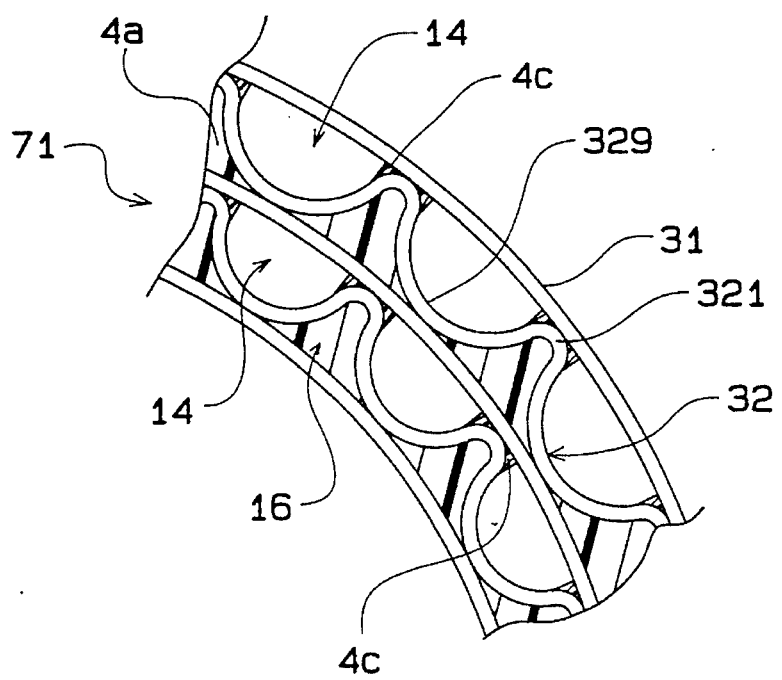
FIG. 3 is a top plan view of the upper side of the filter element of the first embodiment.

As shown in FIGS. 2 and 3, the cross-section of the inlet paths 14 is made semicircular.

In addition, as understood from FIGS. 1 to 3, the open surface area of the inlet paths 14 at the upper side 71 becomes larger than the closed surface area of the outlet paths 16 due to the above configuration.

In the actual practice, the radius of curvature R1 of the mountain portions 329 is made large (0.8 mm), whereas the radius of curvature R2 of the valley portions 321 is made small (0.4 mm). In this case, the ratio (R1/R2) of the radius of curvature R1 of the mountain portions 329 to the radius of curvature R2 of the valley portions 321 is 2.0. The pitch P of adjacent valley portions 321 is made to 2.5 mm. The distance H between the inner-surface ridge of the mountain portions 329 and the bottom surface of the flat filtering material 31 is made to 1.4 mm. The thickness of the flat filtering material 31 and the corrugated filtering material 32 is 0.2 mm each.

Additionally, as shown in FIGS. 1 and 4, the lower side 79 of the inlet paths 14 is closed in a nearly flat configuration by means of adhesive 4b. That is, the mountain portions 329 of the corrugated filtering material 32 are pressed with respect to the flat filtering material 31, thereby forming a pressed area 39 to provide a large opening area of the outlet paths 16.

Figure 5:
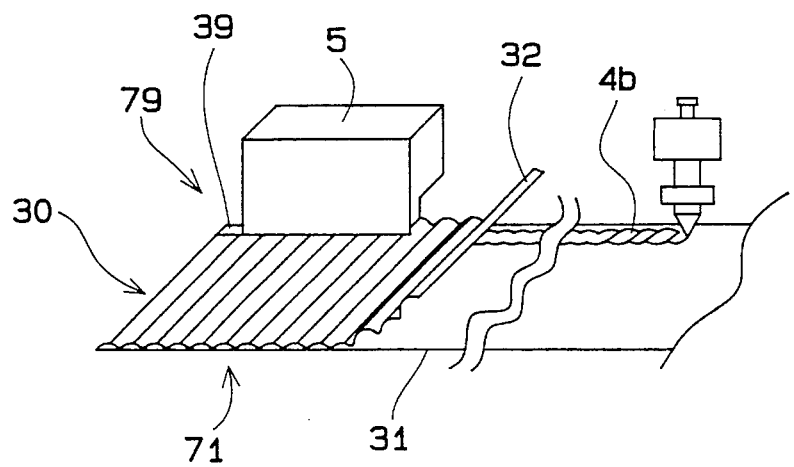
FIG. 5 is an explanatory-view showing the state of manufacture by superposition of a flat filtering material and a corrugated filtering material of the first embodiment.
Figure 6:
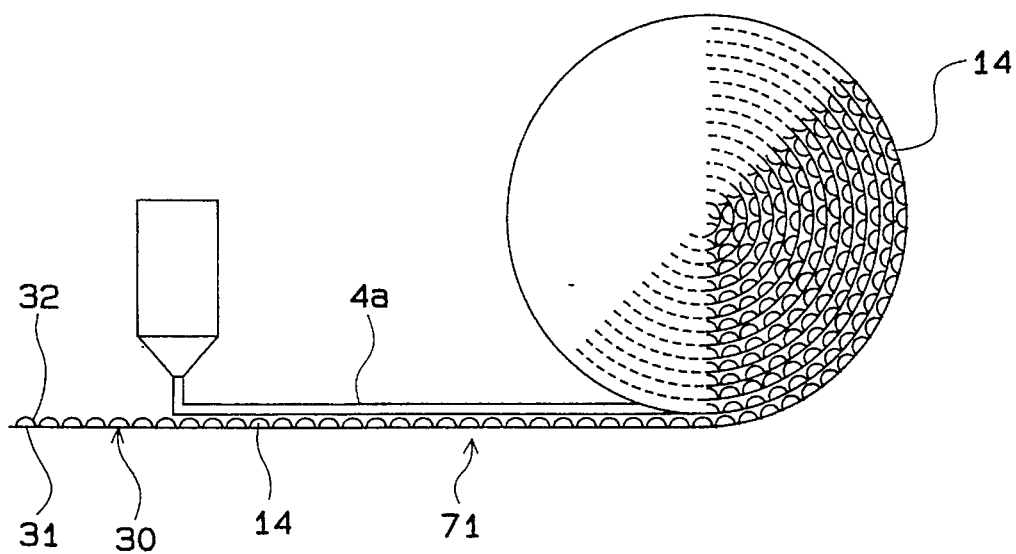
FIG. 6 is an explanatory view showing the method of rolling of the filter paper of the first embodiment.

In manufacturing the above-described filter element, a sheet of filtering material is formed with mountains 329 and valleys 321 to provide the corrugated filtering material 32. As shown in FIG. 5, this corrugated material 32 in a plate form is laid on the flat filtering material 31 in a plate form with the adhesive 4b at the lower side 79 for bonding, and the lower side of the material 32 is pressed by a weight 5 to form the pressed area 39. Thereafter, as shown in FIG. 6, the bonded materials 31 and 32 are rolled into a spiral shape with the adhesive 4a on the material 32 only at the upper side thereof.

Figure 8:
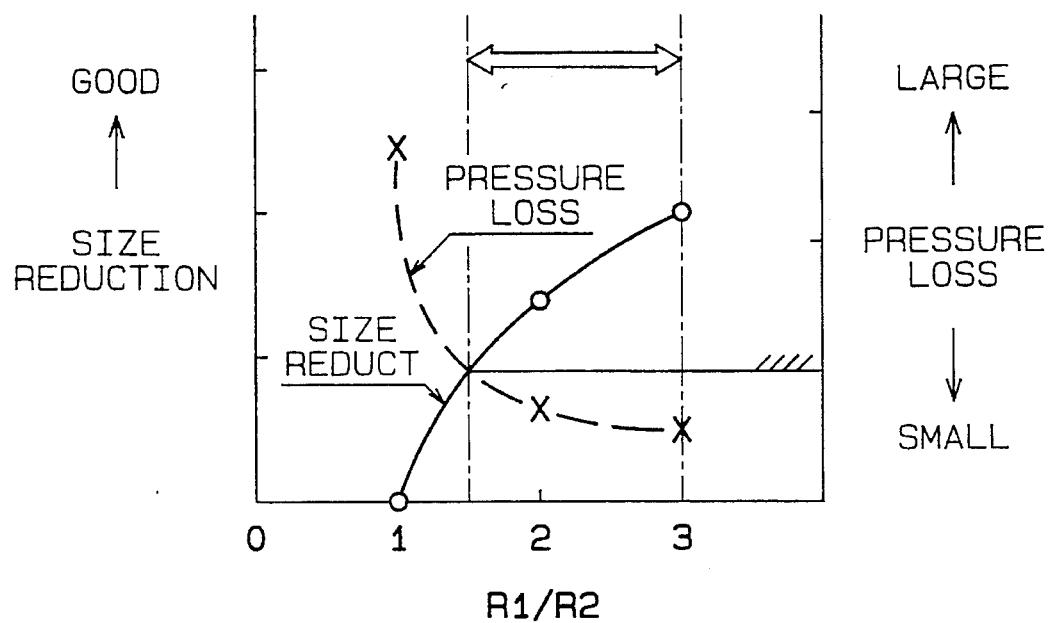
FIG. 8 is a graph showing the relationships of the compactness and the pressure loss of the filter element to the ratio (R1/R2) of radii of curvature of the mountain portions and valley portions of the corrugated filtering material in the first embodiment.

With respect to the above embodiment of this invention, as shown in FIG. 8, measurements were made regarding the relationships between the ratio (R1/R2) of the radii of curvature R1 and R2 of the corrugated filtering material 32, the compactness of the filter element, and the pressure loss of the filtering material. The above-mentioned measurements were conducted by varying the radii of curvature of the corrugated filtering material.

The compactness of the filter element refers to the overall volume of the filter element which is required in order to demonstrate identical filtering capacity.

Additionally, pressure loss refers to the differential pressure generated when the fluid passes from the inlet path to the outlet path.

It can be seen from FIG. 8 that the larger the ratio (R1/R2) of the radii of curvature of the mountain portions and valley portions of the corrugated filtering material 32 is, the greater or better is the compactness or size reduction of the filter element and the lower is the pressure loss. Also, when the foregoing ratio is within the range of 1.5 to 3.0, there is no particular pressure loss, and compactness is good.

In the above-described embodiment, the outer surface of the ridges of the mountain portions 329 are kept in contact with the flat filtering material 31 (31b). Additionally, the outer surface of the ridges of the valley portions 321 are kept in contact with the flat filtering material 31 (31a). Of the corrugated filtering material 32 between the ridges of the mountain portions 329 and the ridges of the valley portions 321, virtually all of the range toward the outer surface of the ridges of its mountain portions 329 forms an arc-shaped wall which is a convexity that primarily faces the flat filtering material 31b, and the small range close to the valley portions 321 is formed in a semicircular configuration that is a convexity facing the flat filtering material 31a. In this embodiment, the arc-shaped walls which are convexities facing the flat filtering material 31b are continuous with other arc-shaped walls which are ridges of the mountain portions 329, and form mountain portions which are semicircular overall.

Additionally, the radius of curvature R1 of the mountain portions 329 is made larger than the radius of curvature R2 of the valley portions 321, and the area in cross section of the inlet ports 14 is made larger than the area in cross section of the outlet paths 16. This permits greater resistance to clogging, improved filter performance, and reduced pressure loss, and can achieve much greater compactness of the filter element 3.

Next, as shown in FIGS. 2 and 3, at the upper side 71 of the filter element 3 where fuel flows in, the open surface area of the inlet paths 14 is larger than the closed surface area of the outlet paths 16. At the lower side 79 where fuel 6 flows out, conversely, the open surface area of the outlet paths 16 is larger than the closed surface area of the inlet paths 14. Because of this, pressure loss during passage of fuel 6 through the filter element 3 is small.

Figure 7:
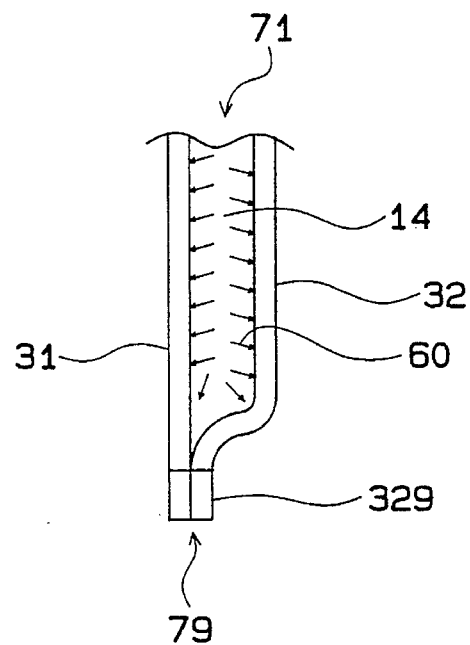
FIG. 7 is an explanatory view showing the operation of the filter element of the first embodiment.

In addition, because the corrugated filtering material 32 has a uniform curvature in semi-circular shape, as shown in FIG. 7, the pressure 60 on the filter surface by the fuel acts in the direction of tension. Because of this, there is no deformation of the corrugated filtering material 32, and sufficient filter performance can be demonstrated.

Next, the flat filtering material 31 and the valley portions 321 of the corrugated filtering material 32 are bonded by adhesive 4c. Because of this, the differential pressure of the inlet paths 14 and outlet paths 16 does not cause deformation such that the substantially semicircular shape of the flat filtering material 31 and corrugated filtering material 32 is widened. Further, there is no deformation or adhesion that constricts the outlet paths. The pressure loss from the inlet paths 14 to the outlet paths 16 can therefore be reduced.

Additionally, because the valley portions 321 with the small radius of curvature R2 are bonded to the flat filtering material 31, the width of the bond areas can be made small, there is little loss of filter surface area due to bonding, and only a small amount of adhesive need be applied.

In addition, because there is no adhesion of the flat filtering material 31 and corrugated filtering material 32, filtering is performed over the entire surfaces of both filtering materials. Because of this, superior filter performance can be demonstrated.

Furthermore, the openings of the inlet paths 14 are susceptible to clogging by contaminants in the fluid, but clogging of the inlet paths can be reduced by enlarged cross-sectional area.

Because the inlet paths 14 are the passages for contaminated fuel, the flow of the fuel is likely to become poor, and wide passages are required. However, because the outlet paths 16 are the passages for filtered fluid, the flow of the fluid is good, and the passages may be narrower than the inlet paths 14.

For this reason, enlarging the cross-sectional area of the inlet paths 14 and reducing the cross-sectional area of the outlet paths 16 causes the filter element with well-balanced fluid flow to be formed.

Also, in this embodiment, one sheet of continuous flat filtering material 31 is rolled so that its superposed inner and outer peripheries serve respectively as the first material and the third material, but separate and independent flat filtering materials may be laminated so that either the upper or lower layer serves as the first material, with the other serving as the third material.

For this reason, the inlet paths 14 and outlet paths 16 are not misaligned, and moreover the cross-sectional configuration of the inlet paths 14 and outlet paths 16 which are formed between the flat filtering material 31 and corrugated filtering material 32 of the filter paper 30 is uniform. In addition, as shown in FIGS. 5 and 6, because the configuration of one of the filtering is flat materials, there is no need to align with care the two filtering materials.

Therefore, it is simple to maintain the amount of adhesive 4a and 4b which is applied at a constantly correct amount, and there is no protrusion of adhesive. Additionally, imperfect sealing does not occur, and bonding is also good.

In addition, it is possible to simplify and reduce the times for application operations, thereby also obtaining suitability for mass production.

Additionally, at the lower side of the inlet paths 14, the corrugated filtering material 32 is pressed with respect to the flat filtering material 31. Because of this, bond strength and seal reliability are enhanced. Also because of this, the surface area of the outlet paths can be enlarged, and the throughput resistance of the outlet side can be reduced.

In addition, when binding filter paper onto a bending roller for applying a corrugated shape to the filter paper, the bindability of the filter paper can be improved. Because of this, the filter paper can be formed reliably.

The foregoing description has described the case where rolling is performed with the flat filtering material lying on the outer side even when rolling is performed with the flat filtering material and the corrugated filtering material lying one atop the other, but it is also possible to perform rolling with the corrugated filtering material lying on the outer side, and similar effects are obtained in this case as well.

Figure 9A:
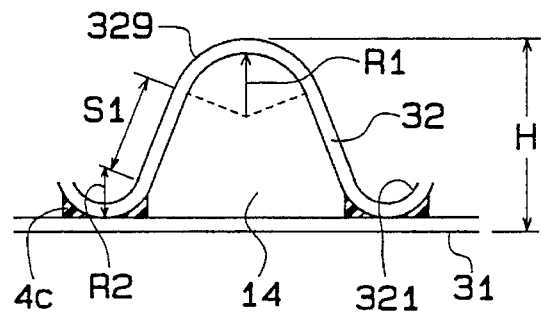
FIGS. 9A to 9C are explanatory views showing the configuration and dimensions of corrugated filtering material having a linear portion in a filter element according to a second embodiment of the present invention.
Figure 9B:
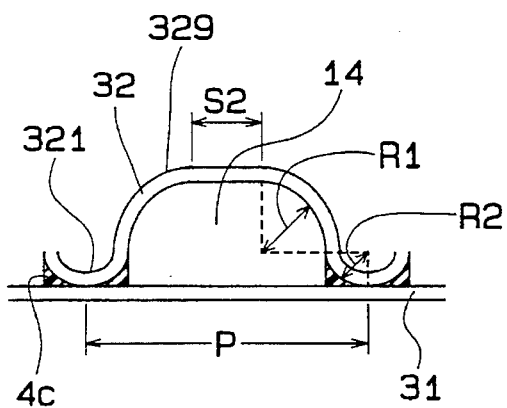
Figure 9C:
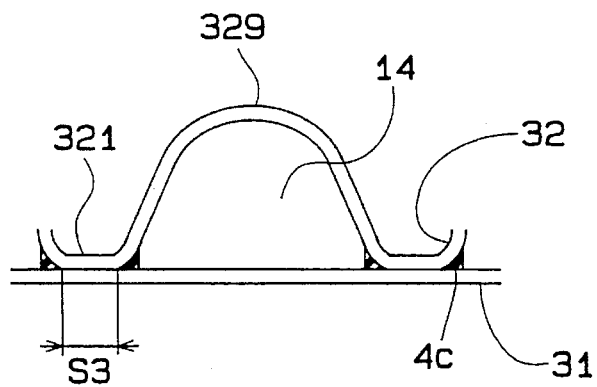
Figure 10:
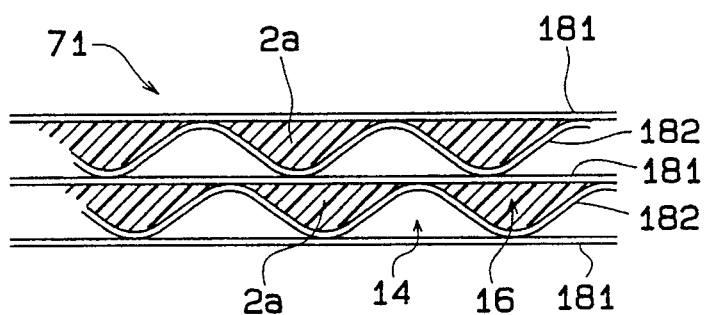
FIG. 10 is an explanatory view showing problems of a filter element of the prior art.
Figure 11:
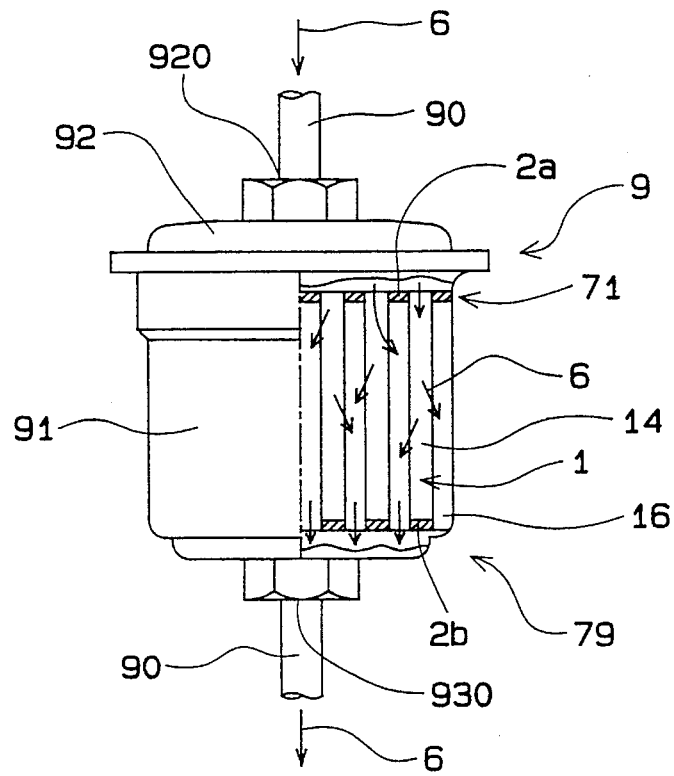
FIG. 11 is a partially cutaway sectional view of a fuel filter in which another filter element of the prior art is incorporated.

In a second embodiment of the present invention, as shown in FIGS. 9A to 9C, a part of the mountain portion or valley portion of the corrugated filtering material has a linear portion. In other respects, this embodiment is identical to the first embodiment.

That is, in the filter element of this embodiment, as shown in FIG. 9A, the corrugated filtering material 32 is provided with a linear portion S1 between the mountain portion 329 and the valley portion 321. In this embodiment the distance H between the topmost ridge of the mountain portion 329 and the bottom surface of the flat filtering material 31 is made to 2.0 mm, and the length of the foregoing linear portion S1 is made to 0.8 mm.

Next, in the above-mentioned corrugated filtering material 32, when the boundary of the radii of curvature R1 and R2 is a curved surface as in the first embodiment, pulsations are generated in the filtering material by the flow of the fluid, and the durability of the filtering material may be degraded. However, by providing a linear portion S1 between the mountain portion 329 and the valley portion 321, as in the case shown in FIG. 9A, the boundary of the radii of curvature R1 and R2 becomes a straight line. Because of this, there is no pulsation and the durability of the filtering material can be improved.

In addition, as shown in FIG. 9B, a linear portion S2 can also be provided on the mountain portion 329 of the corrugated filtering material 32. The linear portion S2 is desirably of a length not more than 0.8 mm. The pitch P of the adjoining valley portion 321 is desirably not less than 3.0 mm.

Next, in the foregoing corrugated filtering material 32, as has been described above, the ridge of narrow width at the cross section of the inlet paths 14 is enlarged, and the height of the inlet path cross section is reduced. Because of this, the number of windings of the filter paper can be made greater, and the total inlet path cross section can thereby be enlarged.

Additionally, as shown in FIG. 9C, a linear portion S3 can also be provided on the valley portion 321 of the corrugated filtering material 32. By means of this, the bond area of the corrugated filtering material 32 and the flat filtering material 31 can be made larger, thereby enhancing the bond reliability.

In addition, in order to allow adjustment of the ratio (R1/R2) of the radii of curvature R1 and R2 of the corrugated filtering material 32, R1 or R2 may be combined with a linear portion.

The filter element of this embodiment provides linear portions S1 and S2 between the mountain portion 329 and valley portion 321 of the corrugated filtering material 32, or on the mountain portion 329. Because of this, the fluid flow area of the inlet paths 14 is made larger than that of the outlet paths 16, and filtering performance is superior.

We claim:

1. A filter element comprising:

a first filtering material of substantially flat configuration;

a second filtering material of substantially non-flat configuration which allows fluid to be filtered to pass in the direction of thickness and has a plurality of mountain portions and valley portions which are formed in parallel alternation so as to extend to a lower side from an upper side of fluid flow, ridges of said mountain portions being in contact with said first material, more than one-half of said second material forming said mountain portions and said mountain portions being in convex relation only toward said first material;

a third filtering material of substantially flat configuration provided in contact with ridges of said valley portions of said second material;

an upper side closing material which closes spaces between said first material and said second material at a position close to the upper side of the fluid flow;

a lower side closing material which closes spaces between said second material and said third material at a position close to the lower side of the fluid flow;

spaces defining fluid inlet paths between the ridges of said valley portions and the ridges of said mountain portions being formed by axially extending arc-shaped walls which are convexities; and a closed surface area of said upper side closing material being smaller than an upper side open surface area of said inlet path.

2. A filter element according to claim 1, wherein said second material and one of said first and third materials are bonded to form a single unit, and plurality of such units are stacked so that said first material functions as said third material.

3. A filter element according to claim 2, wherein said closing materials are formed by adhesives for bonding.

4. A filter element according to claim 3, wherein said single unit is formed as a lengthy material which is rolled in a spiral configuration.

5. A filter element according to claim 4, wherein said mountain portions of said second material are convexities which face the inner rolled periphery of said one of said first and third materials.

6. A filter element according to claim 1, wherein two said arc-shaped walls which are positioned both sides of each of said ridges of said mountain portions of said second material are formed as a substantially continuous arc of radius of curvature R1.

7. A filter element according to claim 6, wherein each of said ridges of said valley portions is formed as an arc of radius of curvature R2, and said radius of curvature R2 is smaller than said radius of curvature R1.

8. A filter element according to claim 7, wherein the ratio R1/R2 of radii R1 and R2 is not less than 1.5 and not more than 3.0.

9. A filter element according to claim 1, wherein two said arc-shaped walls which are positioned both sides of each of said ridges of said mountain portions are formed as a substantially continuous arc of radius of curvature R1, each of said ridges of said valley portions is formed as an arc of radius of curvature R2, and the radius of curvature R2 is smaller than the radius of curvature R1.

10. A filter element according to claim 1, wherein said second material and said third material are such that said mountain portions are pressed toward said third material at a position close to said lower side of fluid flow, and said lower side closing material is provided at said pressed portion.

11. A filter element according to claim 1, wherein said mountains and valleys of said second material are pressed toward said third material and deformed into a straight shape only at the lower side of the fluid flow to close said fluid inlet path.

12. A filter element according to claim 1, wherein said valleys have flat portions which contact with said at least one of first and third materials.

13. A filter element according to claim 1 wherein a flat portion of prescribed width is located on each of said ridges of said mountain portion of said second material.

14. A filter element
a first filtering material of substantially flat configuration;
a second filtering material of substantially non-flat configuration which allows fluid to be filtered to pass in the direction of thickness and has a plurality of mountain portions and valley portions which are formed in parallel alternation so as to extend to a lower side from an upper side of fluid flow, ridges of said mountain portions being in contact with said first material;
a third filtering material of substantially flat configuration provided in contact with ridges of said valley portions of said second material;
an upper side closing material Which closes spaces between said first material and said second material at a position close to the Upper side of the fluid flow;
a lower Side closing material which closes spaces between said second material and said third material at a position close to the lower side of the fluid flow;
spaces defining fluid inlet paths between the ridges of said valley portions and the ridges of said mountain portions being formed by axially extending arc-shaped walls which are convexities; and
a closed surface area of said upper side closing material being smaller than an upper side open surface area of said inlet path;
two said arc-shaped walls which are positioned on both sides of each of said ridges of said mountain portions being formed as a substantially continuous arc of radius of curvature R1, each of said ridges of said valley portions being formed as an arc of radius of curvature, and the radius of curvature R2 is smaller than the radius of curvature R1,
a ratio R1/R2 of radii R1 and R2 being not less than 1.5 and not more than 3.0.

15. A filter element according to claim 14, wherein ratio R1/R2 is around 2.0.

16. A filter element comprising:
a first filtering material having a substantially uniform thickness and rolled into a spiral shape;
a second filtering material having a substantially uniform thickness, being formed into a corrugated configuration having mountain portions and valley portions, and rolled into a spiral shape in a manner sandwiched between said first material;
said mountain portions being formed so as to be mutually parallel together and extending from an upper side of fluid flow to a lower side with its height becoming lower at said lower side;
each of said mountain portions of said second material having an arc-shaped cross section which is less than a semicircle and larger than each of said valley portions and which is a continuous convexity facing the inner periphery of the roll of said first material;
said valley portions of said second material being formed between said mountain portions so as to have external surfaces each of which has a radius of curvature R2 smaller than a radius of curvature R1 of said arc-shaped cross section of said mountain portions;
a lower side closing material disposed between a surface of an inner periphery of said arc-shaped cross section of said second material and a surface of inner periphery of said first material, positioned at said lower side of fluid flow, and bonding said first material and said second material together so that an inlet path formed therebetween is closed thereby; and
an upper side closing material disposed between a surface of an outer periphery of said arc-shaped cross section of said second material and a surface of outer periphery of said first material, positioned at said upper side of fluid flow, and bonding said first material and said second material together so that an outlet path formed therebetween is closed thereby, the closed surface area thereof being smaller than an upper side open surface area of said inlet path.

17. A filter element comprising:
a first filtering material having a substantially uniform thickness and rolled into a spiral shape;
a second filtering material having a substantially uniform thickness, being formed into a corrugated configuration having mountain portions and valley portions, and rolled into a spiral shape in a manner sandwiched between said first material
said mountain portions being formed so as to be mutually parallel together and extending from an upper side of fluid flow to a lower side with its height becoming lower at said lower side;
each of said mountain portions of said second material having an arc-shaped cross section which is less than semicircular and which is a convexity facing the inner periphery of the roll of said first material;
said valley portions of said second material being formed between said mountain portions so as to have external surfaces each of which has a radius of curvature R2 smaller than a radius of curvature R1 of said arc-shaped cross section of said mountain portions;

a lower side closing material disposed between a surface of an inner periphery of said arc-shaped cross section of said second material and a surface of inner periphery of said first material, positioned at said lower side of fluid flow, and bonding said first material and said second material together so that an inlet path formed therebetween is closed thereby; and an upper side closing material disposed between a surface of an outer periphery of said arc-shaped cross section of said second material and a surface of outer periphery of said first material, positioned at said upper side of fluid flow, and bonding said first material and said second material together so that an outlet paths formed therebetween is closed thereby, the closed surface area thereof being smaller than an upper side open surface area of said inlet path, the ratio R1/R2 of radii R1 and R2 being not less than 1.5 and not more than 3.0.

18. A method of manufacturing a filter element comprising:

a formation step wherein a corrugated filtering material of a substantially uniform thickness having alternating mountain portions and valley portions, each of said mountain portions having an arc-shaped cross-section which is nearly semicircular and formed such that a radius of curvature R1 of said arc-shaped cross section of each of said mountain portions is larger than a radius of curvature R2 of each of said valley portions;

an assembly step following said formation step wherein said corrugated filtering material is disposed between flat first and second filtering materials so that an inlet path of fluid flow is formed between the corrugated material and the first filtering material, and an outlet path of fluid flow is formed between said corrugated filtering material and said second filtering material at an opposite side of said inlet path;

a first closing step closing a lower side of said inlet path by means of adhesive material; and a second closing step closing an upper side of said outlet path by means of adhesive material such that a closed surface area is smaller than an upper side open surface area of said inlet path.

19. A method according to claim 18, wherein an assembly of said corrugated material and said first flat material are rolled in a spiral configuration such that said first flat material defines said second flat material and an arc-shaped cross section of said mountain portions of said corrugated material become convexities facing a center of roll, and wherein said first flat material is positioned on both inner and outer sides of said corrugated material.

20. A method of manufacturing a filter element comprising:

a formation step wherein a corrugated filtering material of a substantially uniform thickness having alternating mountain portions and valley portions, each said mountain portion having an arc-shaped cross-section which is nearly semicircular and formed such that a radius of curvature R1 of said arc-shaped cross section of each of said mountain portions is larger than a radius of curvature R2 of each of said valley portions;

an assembly step following said formation step wherein said corrugated filtering material is disposed between two flat filtering material layers so that an inlet path of fluid flow is formed between the corrugated material and one of the two filtering material layers, and an outlet path of fluid flow is formed between the corrugated material and the other of the two filtering material layers at an opposite side of said inlet path;

a first closing step closing a lower side of said inlet path by means of adhesive material; and a second closing step closing an upper side of said outlet path by means of adhesive material such that a closed surface area is smaller than an upper side open surface area of said inlet path, said first closing step including a pressing step in which a lower side of said corrugated filtering material is pressed to said one flat filtering material layer so that a cross-sectional closed surface area of said inlet path is reduced.

21. The filter element comprising:

a first filtering material shaped in substantially flat configuration;

a second filtering material shaped in a corrugated configuration in cross section which is an alternation of a first ridge portion, a second ridge portion and a connection portion between said first ridge portion and said second ridge portion, said second filtering material being in contact with said first filtering material at said first ridge portion to form a fluid outlet path with said first filtering material, and said connection portion being continuously curved to convex substantially only towards said first filtering material;

a third filtering material shaped in substantially flat configuration and in contact with said second ridge portion to form a fluid inlet path with said second filtering material;

an upstream closure provided at an upstream side of said fluid outlet path relative to direction of fluid flow; and a downstream closure provided at a downstream side of said fluid inlet path relative to the direction of fluid flow, wherein said first ridge portion and said second ridge portion are shaped substantially in an arc form having a first radius R1 of curvature and a second radius R2 of curvature smaller than said first radius R1 of curvature, respectively.

22. The filter element according to claim 21, wherein a ratio R1/R2 of said radii of curvature is between 1.5 and 3.0.

23. The filter element comprising:

a first filtering material shaped in substantially flat configuration;

a second filtering material shaped in a corrugated configuration in cross section which is an alternation of a first ridge portion, a second ridge portion and a connection portion between said first ridge portion and said second ridge portion, said second filtering material being in contact with said first filtering material at said first ridge portion to form a fluid outlet path with said first filtering material, and said connection portion being continuously curved to convex substantially only towards said first filtering material;

a third filtering material shaped in substantially flat configuration and in contact with said second ridge portion to form a fluid inlet path with said second filtering material;

an upstream closure provided at an upstream side of said fluid outlet path relative to direction of fluid flow; and a downstream closure provided at a downstream side of said fluid inlet path relative to the direction of fluid flow, wherein said second filtering material is deformed to be in substantially flat form only at the downstream side so that said first ridge portion and said connection portion become parallel to said third filtering material.

24. A filter element comprising:

a first filtering material shaped in substantially flat configuration;

a second filtering material shaped in a corrugated configuration in cross section which is an alternation of a first circular portion having a radius R1 of curvature, a second circular portion having a radius R2 of curvature smaller than said radius R1 of curvature and a connection portion between said first circular portion and said second circular portion, said second filtering material being in contact with said first filtering material at said first circular portion to form a fluid outlet path with said first filtering material, and a ratio R1/R2 of said radii of curvatures being between 1.5 and 3.0;

a third filtering material shaped in substantially flat configuration and in contact with said second circular portion to form a fluid inlet path with said second filtering material;

an upstream closure provided at an upstream side of said fluid outlet path relative to a direction of fluid flow; and a downstream closure provided at a downstream side of said fluid inlet path relative to the direction of fluid flow.

25. The filter element to claim 24, wherein said connection portion is shaped in a curved form which convexes only toward said first filtering material.

26. The filter element according to claim 24, wherein said connection portion includes a straight portion.

* * * * *